United States Patent

Shapiro

[11] Patent Number: 5,836,239
[45] Date of Patent: Nov. 17, 1998

[54] UTENSIL FOR BAKING POTATOES

[76] Inventor: Julie Shapiro, 100 Schoharie Dr., Jericho, N.Y. 11753

[21] Appl. No.: 798,360

[22] Filed: Feb. 10, 1997

[51] Int. Cl.[6] .................................................... A47J 37/10
[52] U.S. Cl. ............................ 99/421 V; 99/419; 99/426; 219/732; 219/762
[58] Field of Search ................................. 99/421 V, 419, 99/426, 440; 219/725, 732, 730, 762; 211/125

[56] References Cited

U.S. PATENT DOCUMENTS

| 997,653 | 7/1911 | Doersch | 99/419 |
| 3,379,118 | 4/1968 | Perez | 99/419 |
| 4,558,197 | 12/1985 | Wyatt | 99/419 X |
| 4,887,523 | 12/1989 | Murphy et al. | 99/421 V X |

*Primary Examiner*—Reginald L. Alexander
*Attorney, Agent, or Firm*—Steinberg & Raskin, P.C.

[57] ABSTRACT

A utensil for baking potatoes including at least one member having a bottom wall and a plurality of upwardly extending side walls, the bottom and side walls defining a partially enclosed cooking space between them, and at least one spike member having a first end and a second end, the first end being fixed to the bottom wall and the second end extending through the cooking space between the side walls.

14 Claims, 1 Drawing Sheet

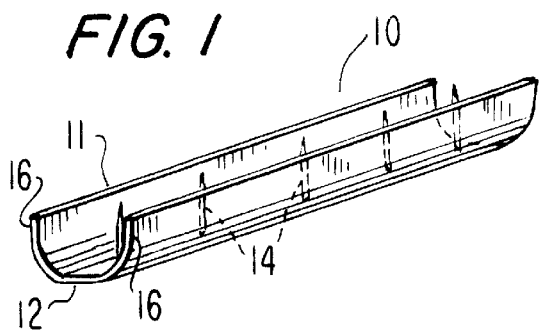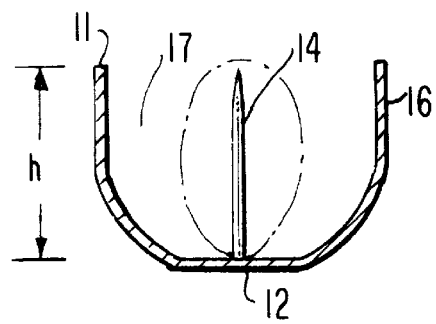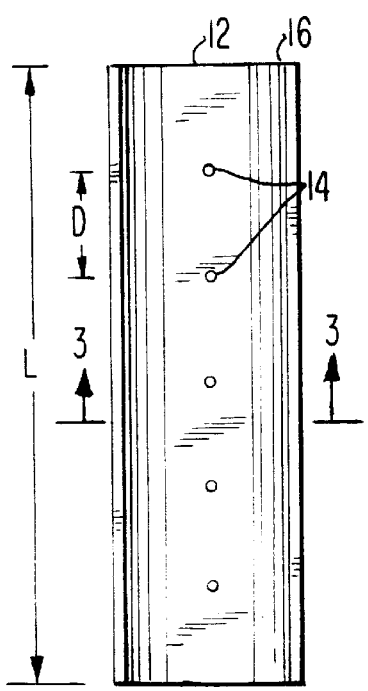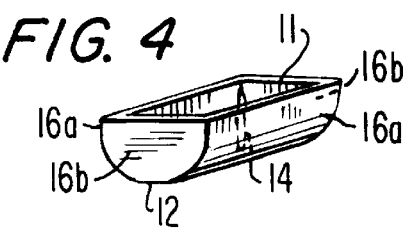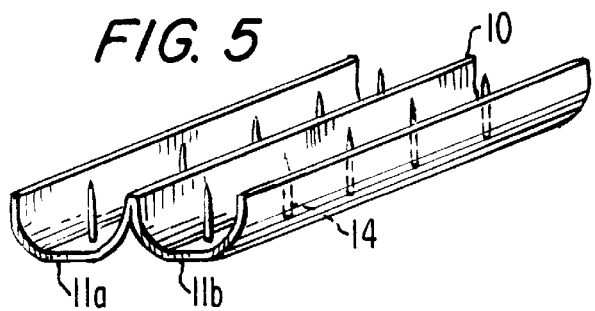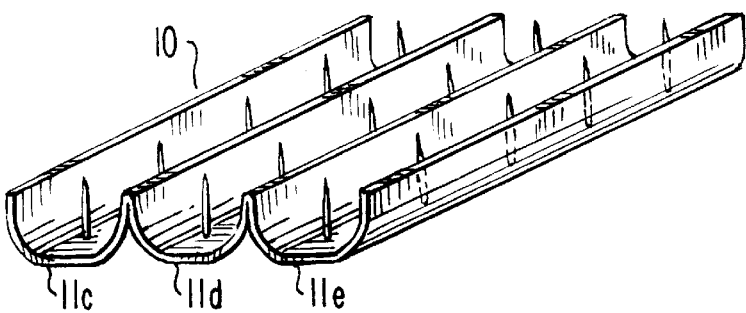

UTENSIL FOR BAKING POTATOES

BACKGROUND OF THE INVENTION

The present invention relates generally to cooking utensils and, more particularly, to utensils for use in baking potatoes.

Potatoes are a staple in the average diet due to, among other things, their low cost and high nutritional value. Potatoes are low in both fat and calories and are a good source of starch. In addition, potatoes can be prepared in a variety of ways and served as either a main course or as a side dish, for breakfast, lunch or dinner. While there are many ways to prepare potatoes, e.g. boiling, baking, frying and, more recently, by microwave, baking is probably the most common. The present invention relates to an apparatus for cooking a whole potato by baking.

The traditional method for baking a potato involves placing the raw potato on a baking sheet and thereafter sliding the sheet into a conventional convection oven or a toaster oven. There are many problems, however, in using this method. For example, the potato may roll around the sheet during cooking causing the potato to become cooked unevenly throughout. Furthermore, the potato can easily roll off the sheet while the sheet is removed from the oven, creating the likelihood that the potato will be exposed to unsanitary conditions. In addition, one side of the potato is always face down on the cooking sheet again causing uneven cooking. In order to achieve uniform cooking throughout the entire potato using this process, one must repeatedly open the hot oven during cooking to rotate the potato, creating an uncomfortable situation. Another problem with the traditional baking method is that the part of the potato skin that contacts the cooking sheet may become stuck to the sheet during cooking. Moreover, the baking sheet, having a plurality of potatoes resting thereon, is cumbersome to maneuver around the kitchen.

Many attempts have been made to alleviate the problems which occur when baking potatoes. For example, it is known in the art to use metal racks having upright pointed teeth or tongues of thin metal on which the potatoes are impaled, with the teeth serving to hold the potatoes in a spaced apart relationship on the rack to expose the entire surface of each of the potatoes to the cooking heat. It is also known to use vertically extending spikes instead of teeth or tongues.

OBJECTS AND SUMMARY OF THE INVENTION

Even though such devices improved on many of the disadvantages noted above, a problem remains in that it still takes a long time to bake a raw potato (approximately 45–55 minutes).

Therefore, it is an object of the present invention to provide a utensil for baking potatoes which overcomes the problems noted above and which accelerates the baking time.

In accordance with the present invention, this object is attained by providing a utensil for baking potatoes comprising at least one member including a bottom wall and a plurality of upwardly extending side walls, the bottom and side walls defining a partially enclosed cooking space between them, and at least one spike member having a first end and a second end, the first end being fixed to the bottom wall and the second end extending through the cooking space between the side walls.

In a preferred embodiment of the invention, the member is an elongate member, the side walls include a pair of side walls in opposed relationship to each other, and a plurality of spike members are fixed along the length of the bottom wall of the elongate member. Each spike member is preferably about four to about seven inches long and the spike members are preferably spaced apart from one another a distance of about four to about six inches, i.e., an amount of space sufficient to place a larger than average-sized potato on each spike member while still having space left between adjacent potatoes. The side walls preferably extend upwardly at least a distance equal to the length of the spike members. According to another preferred embodiment of the invention, each element of the utensil, i.e., the member including the bottom and side walls, and the spike members, is formed of a material that is a good conductor of heat, e.g. aluminum.

In another preferred embodiment of the invention, a utensil may be formed by joining two or more members together by means of the upwardly extending side walls. In such an embodiment, it is possible to increase the number of potatoes which can be baked at a single time. As in the preferred embodiment discussed above, spike members are spaced along the length of each bottom wall at such a distance whereby a larger than average-sized potato is able to be placed on each spike member with space remaining between each adjacent pair of potatoes.

It is an advantage of the present invention over prior potato-baking utensils that, according to the utensil of the present invention, a potato can be baked in a relatively short period of time (20–25 minutes). This is accomplished by providing a member including a bottom wall and side walls extending upwardly therefrom defining a partially enclosed cooking space and vertical spike members fixed to the bottom member and extending through the cooking space on which potatoes are impaled. Heat produced by the oven is trapped between the upwardly extending side walls, thus raising the temperature of the air in which the potato is situated and decreasing the time needed to thoroughly bake the potato. In addition, the spike members on which the potatoes are impaled themselves become hot thereby cooking the potato internally. Furthermore, a utensil in accordance with the invention is provided which is user-friendly, as it is easily maneuverable around the kitchen, therefore decreasing the probability of exposure of the potato to unsanitary conditions.

BRIEF DESCRIPTION OF THE DRAWINGS

A more complete appreciation of the present invention and many of the attendant advantages thereof will be readily understood by reference to the following detailed description when considered in connection with the accompanying drawings in which:

FIG. 1 is a perspective view of a first embodiment of the invention;

FIG. 2 is a top view of the embodiment shown in FIG. 1;

FIG. 3 is a cross-sectional view taken along line 3—3 of FIG. 2;

FIG. 4 is a perspective view of a second embodiment of the invention;

FIG. 5 is a perspective view of a third embodiment of the invention; and

FIG. 6 is a perspective view of a fourth embodiment of the invention.

DETAILED DESCRIPTION OF THE INVENTION

Referring now to FIGS. 1–6 of the drawings wherein like reference characters designate identical or corresponding parts throughout the several views, and in particular to FIGS. 1–3, a first embodiment of a utensil 10 for baking potatoes in accordance with the present invention is shown. Utensil 10 comprises a single member 11 including bottom wall 12 and a pair of upwardly extending side walls 16 which have opposed inwardly facing surfaces. The bottom and side walls define a partially enclosed cooking space 17 (FIG. 3) between them. A plurality of spike members 14 are fixed to bottom wall 12 at one end, and the other end of spike members 14 extends through the cooking space. It is noted that while the device of the present invention is designed to be used for baking potatoes, it can similarly be used for baking other vegetables.

The positioning of spike members 14 on bottom wall 12 allows for the cooking of several potatoes at a given time. In the present example and as shown in FIG. 2, the utensil comprises five of such spike members 14 such that adjacent spike members are spaced apart from one another a distance D (FIG. 2) where D is preferably about three to about seven inches. Bottom wall 12 has a length L such that a desired number of potatoes are able to be baked at a given time. The greater the length L, the larger the number of spike members can be fixed on bottom wall 12 and the larger the number of potatoes can be baked at a given time.

An important aspect of the present invention is the upwardly extending side walls 16. As shown in FIG. 3, the pair of side walls 16 have opposed inwardly facing surfaces and extend upwardly to a height h of about four to about twelve inches such that the top of each side wall 16 extends at least to the top of spike members 14. The inwardly facing surfaces of side walls 16, together with bottom wall 12, define a partially enclosed cooking space 17 in which the heat emitted from the oven becomes trapped, thus raising the temperature of the space within which the potato is situated and accelerating the baking time relative to prior art potato-baking utensils, the teeth or spikes of which are connected to a flat grid or frame.

It is noted that, in the figures, side walls 16 have a generally concave configuration relative to the cooking space 17 and, with bottom wall 12, form a utensil having a substantially semi-circular cross-section. However, side walls 16 can be formed having any shape by which a partially enclosed cooking space is defined such that the desired goals stated above are still accomplished.

Bottom wall 12, side walls 16 and spike members 14 may be formed of any material which conducts heat, such, for example, as aluminum. In this manner, when placed in the oven, the device 10 absorbs heat and then acts as a heat sink so as to maintain the temperature of the spike members 14 at a high level to thereby internally cook the potato impaled on the spike member. That is, not only will the potato be cooked from the outside by the heat which is trapped between the walls, but the potato will also be cooked from within by the heated spike member. Such feature of the present invention further accelerates the baking time.

Alternatively, bottom wall 12 and side walls 16 may be formed of a material which does not conduct heat. In this embodiment, the inwardly facing surfaces of the walls 16 and the top surface of bottom wall 12 may be lined with a heat-conducting material thereby conveying heat to the spike member. For example, the side walls 16 and bottom wall 12 may be formed of tempered glass whose inwardly facing surfaces are coated with aluminum.

In FIG. 4, a utensil 10 is depicted including a member 11 having a length considerably shorter than that which is illustrated in FIG. 1. That is, the utensil of FIG. 4 is designed to bake a single potato at a time in, for example, a standard toaster oven. This embodiment of the invention includes two pairs of opposed side walls 16a, 16b extending from bottom wall 12.

Spike members 14 are preferably soldered onto bottom wall 12 while member 11, including bottom wall 12 and side walls 16, is preferably formed from a single blank of metal or the like formed into its desired shape. Therefore, the manufacture of such embodiments of the present invention requires only two operations and therefore is inexpensive to produce. It is noted that spike members 14 can be fixed to bottom wall 12 by any method by which the spike members are in heat transfer relationship with the bottom wall. Similarly, it is possible to form side walls 16 separate from the bottom wall 12 in the manufacture of the utensil.

Each spike member 14 generally extends in a substantially vertical direction about four to about seven inches such that it is long enough to securely hold a potato in its upright position. It is noted that not only do spike members 14 act as both securing means to couple the potato to the utensil and cooking means to internally cook the potato, but it has been shown that the quality of baked potatoes have been improved by puncturing them at one end, and during the baking process, positioning the puncture in such a way as to permit moisture to escape. Thus, the puncturing of the potato insures proper venting of the potato and prevents its bursting under the action of heating or baking.

FIG. 5 shows a third embodiment of the present invention wherein the utensil 10 comprises two members 11a,11b joined together. Specifically, members 11a,11b are joined at the upper edges of their adjacent side walls. In utilizing the device of this embodiment, it is possible to bake twice the amount of potatoes as is possible using the device of FIG. 1. The characteristics and dimensions of each member 11a,11b and spike members 14 are identical to those described above in connection with the device of FIG. 1.

FIG. 6 shows a fourth embodiment of the present invention wherein the utensil 10 comprises three members 11c, 11d,11e joined together at the upper edges of their respective adjacent side walls.

Another important advantage of the invention is the ease with which the utensil can be maneuvered by the user. Since each potato is secured on a spike and positioned between side walls 16, one can transport the utensil containing the potatoes from the oven to the table without ever handling the potatoes at any time after placing them on the utensil for baking. Thus, as the potatoes are continuously shielded from the user as well as the environment, the chances of the potatoes being exposed to unsanitary conditions are greatly minimized.

Obviously, numerous modifications and variations of the present invention are possible in light of the teachings hereof. While only four embodiments of the present invention are illustrated herein, it is possible that, depending on the size of the potatoes, the size of the oven and the amount of potatoes to be baked, the dimensions and spatial relationship of the spike members as well as the number of interconnected members comprising the invention can vary accordingly. Therefore, it is to be understood that the invention can be varied from the detailed description above within the scope of the claims appended hereto.

What is claimed is:

1. A utensil for baking potatoes, comprising:
   at least one member including a bottom wall and a plurality of upwardly extending side walls, said bottom and side walls defining a partially enclosed cooking space between them, and at least one spike member for supporting the baking potatoes having a first end and a second end, said first end being fixed to said bottom wall and said second end extending through said cooking space between said side walls wherein said side walls extend upwardly from said bottom wall at least substantially the height of said at least one spike member.

2. A utensil according to claim 1, wherein said at least one member is an elongate member.

3. A utensil according to claim 2, wherein said at least one spike member comprises a plurality of spike members.

4. A utensil according to claim 3, wherein each spike member is spaced apart from one another a distance of three to seven inches and wherein said spike members are spaced along the length of said bottom wall of said elongate member.

5. A utensil according to claim 1, wherein said at least one member is formed from a material which conducts heat.

6. A utensil according to claim 1, wherein said at least one spike member is formed from a material which conducts heat.

7. A utensil according to claim 1, wherein said at least one member is formed from a single blank of metal.

8. A utensil according to claim 1, wherein said at least one spike member is one to twelve inches long.

9. A utensil according to claim 8, wherein said at least one spike member is three to nine inches long.

10. A utensil according to claim 8, wherein said at least one spike member is four to seven inches long.

11. A utensil according to claim 1, wherein said at least one member has a substantially semi-circular cross-sectional shape.

12. A utensil for baking potatoes, comprising:

at least one member including a bottom wall and a plurality of upwardly extending side walls, said bottom and side walls defining a partially enclosed cooking space between them, and at least one spike member for supporting the baking potatoes having a first end and a second end, said first end being fixed to said bottom wall and said second end extending through said cooking space between said side walls wherein each side wall extends upwardly from said bottom wall at least the height of said at least one spike member.

13. A utensil according to claim 12, wherein each of said side walls has a concave configuration relative to said cooking space.

14. A utensil for baking potatoes, comprising:

two members situated in a parallel relationship, each member including a bottom wall and a plurality of upwardly extending side walls, each side wall having an upper edge, such that said two members are coupled to each other along the upper edges of the adjacent side walls of each member, said bottom and side walls of each member defining a partially enclosed cooking space between them, and at least two spike members for supporting the baking potatoes each having a first end and a second end, said first ends of said spike members being fixed to said bottom walls and said second ends extending through said cooking spaces between said side walls.

* * * * *